US005144801A

United States Patent [19]

Scanderbeg et al.

[11] Patent Number: 5,144,801

[45] Date of Patent: Sep. 8, 1992

[54] ELECTRO-HYDRAULIC ACTUATOR SYSTEM

[75] Inventors: Dino Scanderbeg, Laguna Niguel; William D. Wilkerson, Newport Beach; Richard L. Kenyon, Irvine; Michael E. Nolan, Costa Mesa, all of Calif.

[73] Assignee: Parker Hannifin Corporation, Cleveland, Ohio

[21] Appl. No.: 345,156

[22] Filed: Apr. 28, 1989

[51] Int. Cl.[5] .................... F16D 31/02

[52] U.S. Cl. .................... 60/475; 92/142

[58] Field of Search .................... 60/432, 453, 454, 456, 60/473, 474, 475, 476, 415; 92/78, 142; 73/19.1, 25.01, 25.03; 417/371

[56] References Cited

U.S. PATENT DOCUMENTS

| | | | |
|---|---|---|---|
| 2,457,467 | 12/1948 | Hartman | 60/475 |
| 2,918,795 | 12/1959 | Marien | 60/476 X |
| 3,374,625 | 3/1968 | Stuart | 60/476 |
| 3,487,431 | 12/1969 | Forkner | 60/456 X |
| 3,680,359 | 8/1972 | Lynch | 73/25.03 X |
| 3,744,244 | 7/1973 | Swoager | 60/454 |
| 3,747,351 | 7/1973 | Wilkerson et al. | 60/476 |
| 3,753,350 | 8/1973 | Nott | 60/403 |
| 3,764,233 | 10/1973 | Strickland | 417/371 |
| 3,902,318 | 9/1975 | Becker et al. | 60/456 X |
| 3,928,968 | 12/1975 | Becker et al. | 60/403 |
| 3,977,189 | 8/1976 | Kubik | 60/453 |
| 4,003,397 | 1/1977 | Cooper | 60/454 X |
| 4,009,572 | 3/1977 | Cooper | 60/454 |
| 4,041,704 | 8/1977 | Gygli | 60/473 |
| 4,043,127 | 8/1977 | Kubik | 60/454 X |
| 4,439,984 | 4/1984 | Martin | 60/454 |
| 4,469,594 | 9/1984 | Poetter | 60/454 |
| 4,517,135 | 5/1985 | Szerenyi et al. | 73/19.1 |
| 4,667,472 | 5/1987 | Clay et al. | 60/476 X |
| 4,715,180 | 12/1987 | Rosman | 60/372 |
| 5,009,066 | 4/1991 | Vangorder et al. | 60/415 |

*Primary Examiner*—Thomas E. Denion
*Assistant Examiner*—Hoang Nguyen
*Attorney, Agent, or Firm*—Christopher H. Morgan

[57] ABSTRACT

An electro-hydraulic actuator having an electric motor disposed in a hydraulic fluid reservoir and connected to drive a hydraulic fluid pump. The actuator includes a piston rod which extends or retracts as a piston is hydraulically driven in a cylinder. An actuator housing forms the reservoir and cylinder and contains hydraulic passages connecting the pump, reservoir and cylinder. The actuator includes a one-way filter for filtering the hydraulic fluid. The hydraulic pump is preferably a rotating piston type and includes a port plate which allows the pump to drive the piston while the retract and extend chambers of the pump have different or unbalanced fluid drive ratios. A load limiting valve protects the system from excessive hydraulic pressure and a position sensor detects the position of the piston rod.

2 Claims, 4 Drawing Sheets

ELECTRO-HYDRAULIC ACTUATOR SYSTEM

BACKGROUND OF THE INVENTION

1. Field of the Invention

This invention relates in general to hydraulic actuator devices and more particularly to such devices which hydraulically drive linear or rotary actuators.

2. Description of the Prior Art

It has long been recognized that hydraulic, as opposed to purely mechanical or electromechanical actuation is more desireable for certain applications. One reason for this is that hydraulic systems have been found more practical in applications requiring high reliability and large force/velocity capability combined with rapid response. For example, a majority of commercial and military aircraft today use hydraulic actuation for their primary flight control surfaces. However, hydraulic servoactuation has certain limitation, foremost of which is the need for a central hydraulic supply system. A hydraulic pump is required, together with a prime mover to drive the pump, a reservoir, an accumulator, piping to convey the hydraulic pressure to each remotely located servoactuator, etc. There is considerable cost and installation expense, potential maintenance problems due to leakage from the piping, substantial energy losses at the pump, undesirable noise, and for aircraft installations considerable weight and bulk of hardware.

There have been many attempts to replace hydraulic servoactuation systems with electromechanical servoactuation systems, thereby eliminating the central hydraulic supply system. These attempts have accelerated, due to recent development in servomotors using rare earth permanent magnets, and recent developments in the electronic control hardware that such motors require. However, the necessary gearing (and often clutches) between such improved electric motors and the load have emerged as the weak link, and have not improved to the degree necessary to replace hydraulic servoactuation in many applications.

The present invention uses electric motor actuation rather than a central hydraulic supply, but substitutes a self-contained hydraulic transmission for the mechanical transmission. This avoids many of the problems which have not been able to be solved in the mechanical clutches and gears. For example, the present invention can provide an effective gear ratio of 2,000 to 1 or higher between the motor and load, without using any gears. This eliminates the gear tooth fatigue problems encountered in electromechanical servoactuators. The need for clutches in redundant mechanical systems is eliminated; a failed servoactuator constructed in accordance with the present invention can be backdriven by other parallel servoactuators.

Another problem that has long plagued hydraulic systems is leakage. Leakage is essentially eliminated in the present invention by means of a design which provides only one possible leakpoint, rather than the many such potential leakpoints in the prior art. This results in greatly reduced maintenance expense.

Still another problem of prior hydraulic systems is filtration of the fluid. Conventional filtration of the hydraulic fluid is not possible where the flow of the hydraulic fluid is not unidirectional. Flow reversals sweep out contaminant particles created by pump wear. The present invention provides a filtration design which solves this problem, assuring long life for the servoactuator.

In the present invention, the electric motor drives the hydraulic pump on a demand basis, generating only the required pressure and flow. Compared to the prior art, this conserves energy, reduces electrical power costs, and also generates less noise (important in industrial applications). This creates a drive of high efficiency. Still further, the present invention provides self contained failure detection capabilities to reduce maintenance costs.

SUMMARY OF THE INVENTION

It is, therefore, an objective of the present invention to provide a self-contained hydraulic actuator which can be operated electrically. It is also an objective of the present invention to provide such a device which can be monitored electrically. Another objective of the present invention is to provide such a device which is reliable, light weight and compact.

It is also an objective of the present invention to provide an electro-hydraulic actuator with improved sealing characteristics. Yet another objective is to provide such an actuator with an improved filtration ability and an improved actuator rod positioning ability. Still further, it is an objective to provide such an actuator with an improved failure detection system.

In accordance with these and other objectives, the present invention provides an electro-hydraulic actuator which includes an actuator rod having a piston thereon for moving the rod by hydraulic pressure. A fixed displacement bi-directional hydraulic pump is provided for pumping hydraulic fluid to move the actuator rod. A reversible electric motor is mechanically connected to and drives the hydraulic pump. An actuator manifold contains the pump and a reservoir of hydraulic fluid in which the electric motor is submerged. The manifold also includes the actuator cylinder which contains the piston and hydraulic passages connecting the pump to the hydraulic reservoir and the cylinder as required for moving the actuator rod.

The cylinder chamber in which the piston moves is divided by the piston into a "retract" chamber at the forward end and a "extend" chamber at the rearward end of the cylinder. A one way filter system can be provided for either or both of the "retract" and "extend" chambers. The one way filter system is comprised of a passage having a filter and check valve therein allowing fluid flow through the filter only as fluid moves to supply the actuator chamber for a "retract" or "extend" direction of motion. This prevents backwash of contaminants from the filter as reverse flow occurs, while still providing a single filter unit for each actuator package.

In an embodiment where the front or retract chamber of the cylinder has a different volume than the rear chamber, movement of the piston causes an imbalance of hydraulic fluid which is preferably compensated for by an improved rotating piston pump constructed in accordance with the present invention. This piston pump has an asymmetrical port plate. The first port of this plate has a different radial extent from the second port which provides different sizes for the first and second ports. These sizes are matched to the volume/-rod movement ratio of the chamber to which each of the ports is open when the pump rotates. A third port allows the pump to drive the differential volume of hydraulic fluid to and from a variable volume chamber.

The pump and motor of the present invention are preferably reversible variable speed devices, to allow variable speed movement of the actuator rod in either direction by means of electrical signals to the motor. Also, it is preferable that a variable displacement gas reservoir be disposed adjacent to the hydraulic reservoir chamber and separated therefrom by a movable membrane. This movable membrane allows volumetric changes due to thermal gradients of the hydraulic fluid.

Separate temperature sensors are provided in the hydraulic and gas reservoirs of the present invention to measure temperature changes in the gas reservoir and the reservoir of hydraulic fluid. In addition to the temperature measurement the sensors can detect, by the rate of temperature change, the presence of gas in the hydraulic fluid or the presence of oil in the gas chamber.

Also preferably, the present invention provides a position sensor connected to the actuator rod which is driven by the piston of the hydraulic cylinder. In addition, the hydraulic circuit is provided with a load limiter/relief valve, which limits the actuator force output to a preset value.

For a further understanding of the invention, and further features, objectives, and advantages thereof, reference may be had to the following description taken in conjunction with the accompanying drawings.

DESCRIPTION OF PREFERRED EMBODIMENTS

Figure 1:
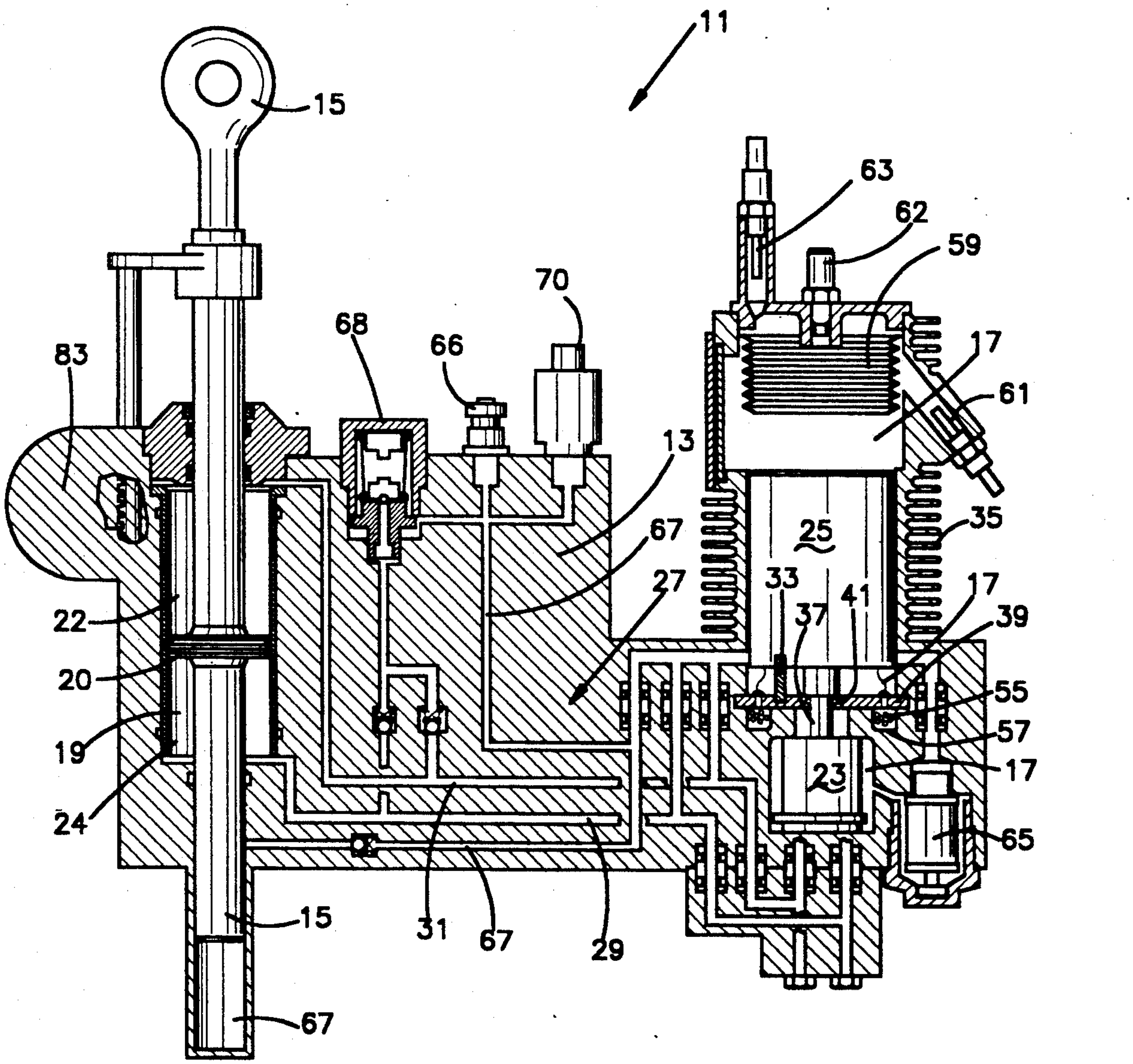
FIG. 1 is a schematic cross sectional view of a device constructed in accordance with the present invention.
Figure 2:
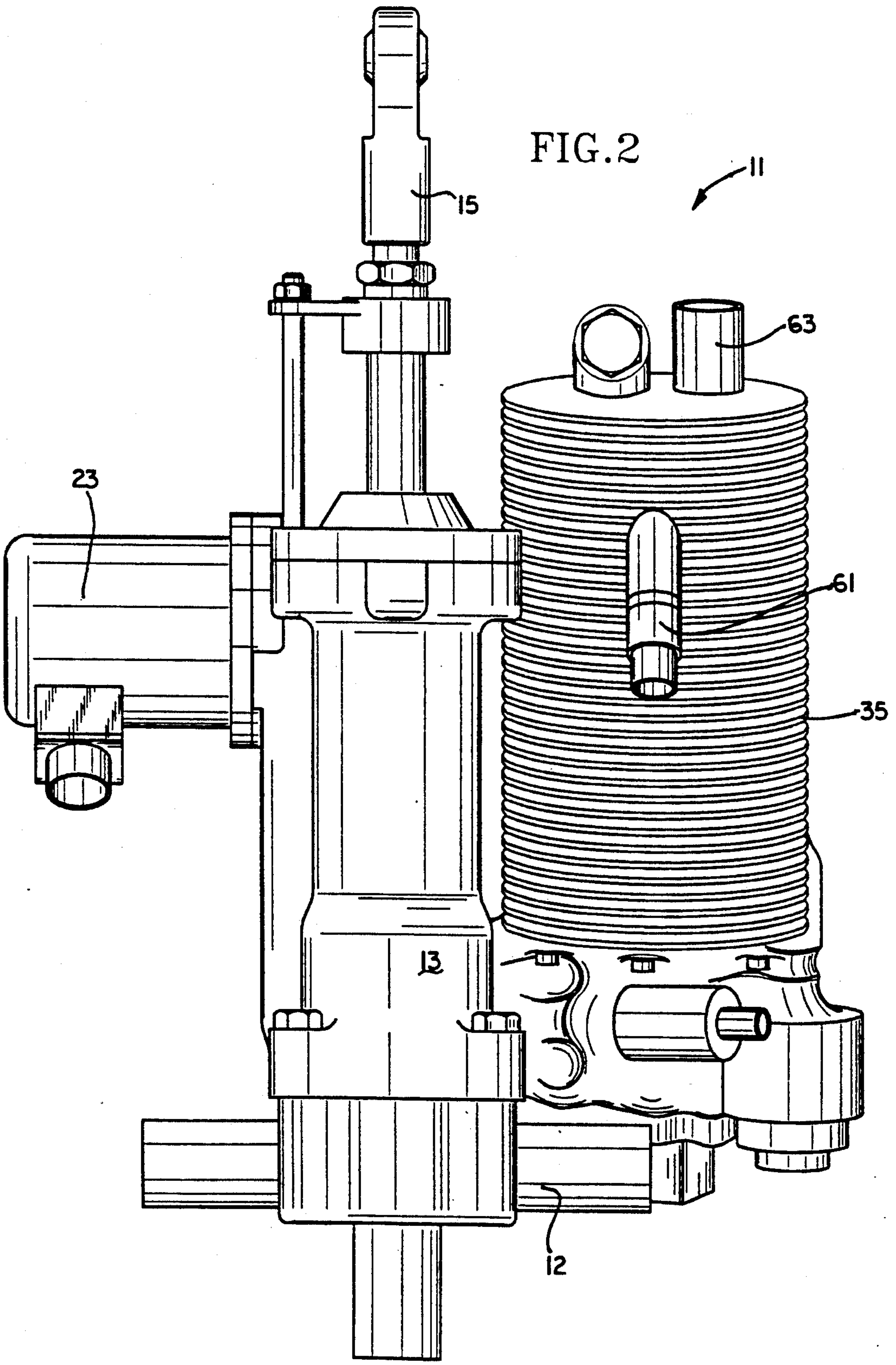
FIG. 2 is a plan view of the device shown in the FIG. 1.

Referring now to FIG. 1 and FIG. 2, a device constructed in accordance with the present invention is shown at 11. The device shown is an actuator of the type used to control flight surfaces in an aircraft.

Although the device 11 is designed specifically for an aircraft, those skilled in the art will recognize that this electro-hydraulic actuator can be adapted for use in many other applications. The device 11 includes a trunion 12 which is formed at one end of the housing 13 to allow the electro-hydraulic actuator 11 to be attached to the structure of an aircraft. The rod end of the actuator shaft 15 can be attached to the flight surface to be moved by the actuator 11.

The housing 13 is comprised of a single piece which extends from an hydraulic fluid reservoir 17 to a cylinder chamber 19 in which a piston 20 moves. The piston 20 is attached to shaft 15 and divides the cylinder chamber 19 into a front chamber 22 and a rear chamber 24.

Disposed within the reservoir 17, and immersed in the hydraulic fluid which fills the reservoir 17, is a hydraulic pump 23 driven by an electric motor 25. The electric motor 25 drives the pump 23 to move hydraulic fluid between the chambers 22 and 24 to extend or retract the actuator shaft or rod 15. Hydraulic fluid passages 27 are machined in housing 13 to port the fluid between the pump 23 and the chambers 22 and 24.

The pump 23 and the electric motor 25 are reversible and operate so that as fluid is being supplied to one of chambers 22 and 24 it is being drawn from the other of the chambers 22 and 24. In this way, the extension and retraction of the actuator rod 15 is positively driven by the pressure of the hydraulic fluid in both of chambers 22 and 24. The pump 23 is bolted to the housing 13 and connected to the motor 25 by a shaft coupling 37. A pin 33 indexes the motor 25 so that the motor 25 is held fixed with respect to the housing 13. Wires 26 disposed in a cavity 28 in housing 13 provide electric power to electric motor 25. A plate 39 separates the portion of reservoir 17 containing the motor 25 from the portion of reservoir 17 containing pump 23. Seals and bearings 41 are provided in plate 39 surrounding shaft 37.

The region surrounding the pump 23 and the interior of the motor 25 are at the reservoir pressure. Consequently, leakage from the pump does not cause leakage of hydraulic fluid from the system; the leakage simply returns to the reservoir, where the fluid is reused. Similarly, no pressure seals are required between the pump 23 and motor 25 interior, eliminating a source of wear and failure present in the prior art.

The portion of the hydraulic reservoir 17 which extends around the motor 25 is provided with heat exchanger fins 35. Because the reservoir 17 is filled with hydraulic fluid, heat from the motor 25 can be rapidly transferred to the housing 13 and dissipated by the fins 35. This advantage results from immersing the motor 25 in hydraulic fluid.

Another advantage of this arrangement of parts is the relatively low weight of hydraulic fluid required to operate the actuator. Relatively little volume of hydraulic fluid is required other than the amount necessary to fill the front and rear chambers 22 and 24.

Figure 3:
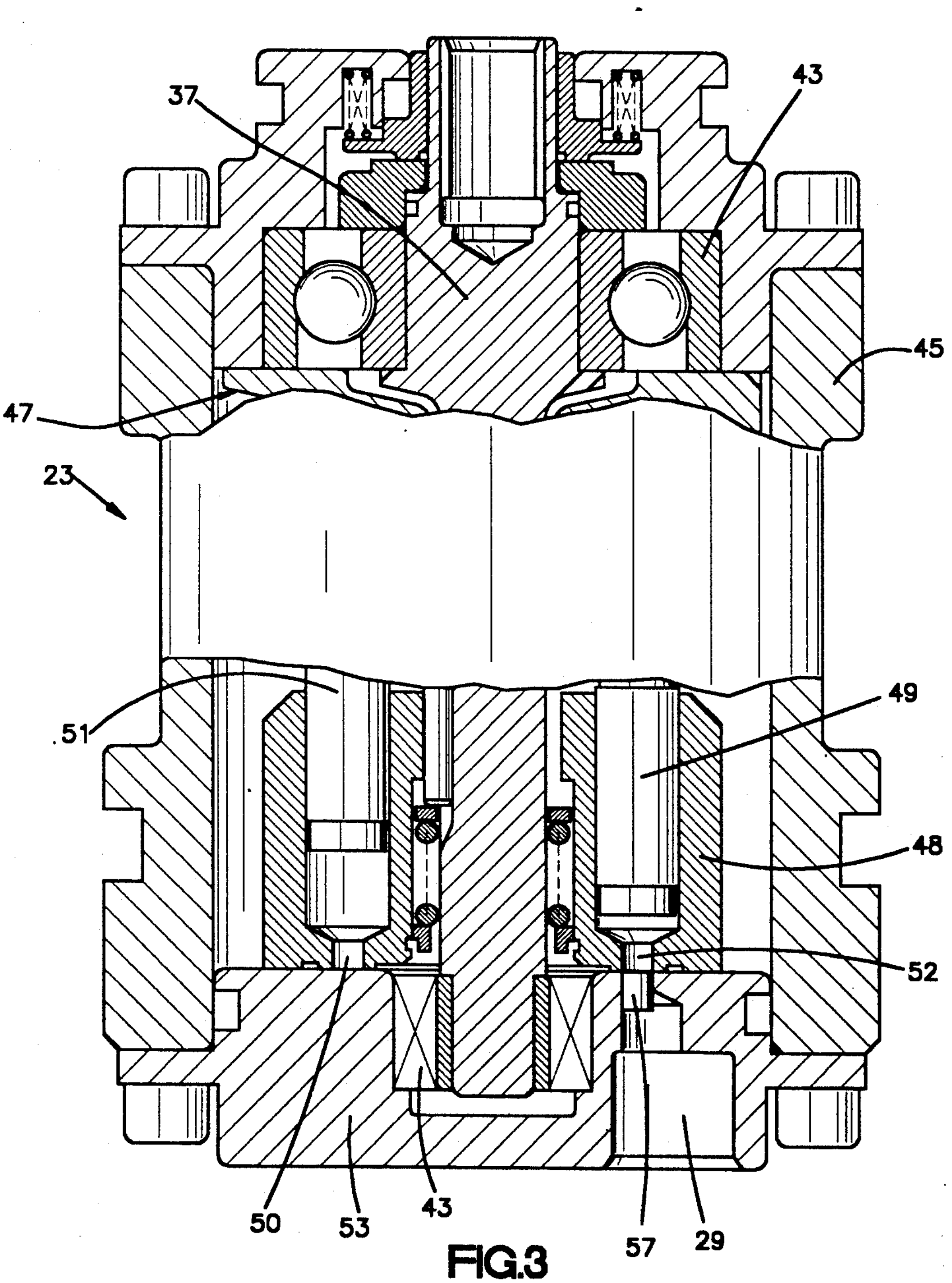
FIG. 3 is a cross sectional view of a portion of the device shown in FIG. 1.

Referring now to FIG. 3, the pump 23 is shown in more detail. The pump 23 is a piston type device. The pump shaft 37 is supported by bearings 43 rotates in a pump housing 45. An assembly of pistons such as pistons 49 and 51 are located in an array around the shaft 37 and connected to rotate therewith. The pistons 49 and 51 are moved in a reciprocating motion as they rotate by means of a swash plate 47 which is designed at a sufficient angle from a perpendicular to shaft 37 to cause the desired amount of fluid displacement by the pistons 49 and 51..

The pistons 49 and 51 are reciprocated in a piston manifold 48. As the pistons 49 and 51 reciprocate they move hydraulic fluid into and out of the pump 23 through openings 50 and 52 in manifold 48. The pump port plate 53 at the end of pump 23 has shaped openings (see FIG. 5) located adjacent the openings 50 and 52 as the pistons rotate, which directs the fluid to and from the passages 29 and 31.

As the shaft 37 rotates, hydraulic fluid is driven to and from the passages 29 and 31. Reversal of the motor and shaft rotation reverses the flow. Thus, the rate of hydraulic flow is directly proportional to the speed of rotation of the pump shaft 37.

Pumps of the type shown as pump 23 of the present invention are well known to those skilled in the art. Although such pumps are especially advantageous for the present invention, it is believed that other reversible hydraulic pumps could be used.

Operation of the motor 25 and pump 23 can result in the generation of heat. It is, therefore, desireable to monitor the temperature in the hydraulic fluid. Temperature sensor 61 is attached to the upper end of reservoir 17 for this purpose. In addition, however, sensor 61 has a resistance heating device which can be pulsed so that the temperature change caused by the heat from the pulsed heating device can be measured. If the decay characteristics of the temperature change following the pulsing of the heating device is too slow, this indicates that undissolved gas is present in the hydraulic fluid and maintenance of the actuator is required.

To allow for changes in the amount of the hydraulic fluid in the reservoir 17, an air filled metal bellows 58 is sealingly connected to the top of the reservoir. The bellows 58 is filled with an inert gas such as nitrogen and, therefore, can expand or contract with the amount of hydraulic fluid in the reservoir 17. A fill port 62 is attached to the housing 13 for filling the bellows 58. A temperature sensor 63 is attached to the housing 13 at upper end of the bellows 58 to allow the temperature of the gas to be measured. As with sensor 61, sensor 63 is provided with a thermocouple to allow the temperature decay characteristics of the gas to be monitored. This allows the presence of liquid in the bellows to be detected. A fill port 60 containing a filter 65 is provided for introducing hydraulic fluid to reservoir 17.

Fluid passages and cavities 67 are provided in the housing 13 to allow hydraulic fluid to be conveyed between various auxiliary components and to protect the system. For example, the passages and cavities 67 extend to the blind end of the housing, past the shaft seal of shaft 15, to prevent a build-up of hydraulic fluid at the end of shaft 15. The passages 67 also connect with a quick-disconnect fitting 66 to allow the actuator to be filled with hydraulic fluid.

The passages 67 also extend from the reservoir 17 to a pressure transducer 70. The pressure transducer 70 allows remote electrical monitoring of the static hydraulic pressure in reservoir 17. Pressure variations in the reservoir 17 may occur due to the thermal expansion or contraction of the fluid or due to depletion of the fluid caused by mechanical, structural or seal failure. The pressure transducer 70 allows remote electrical monitoring of the fluid pressure so that maintenance can be scheduled prior to failures and so that failures can be detected.

The passages 67 also connect the reservoir 17 to a loadlimiter relief valve 68. This valve 68 is connected to passages 29 and 31 to limit the hydraulic fluid loads in the front and rear chambers 22 and 24. When hydraulic pressure in either of these two chambers exceeds a predetermined force level of the load-limiter relief valve 68, fluid is relieved to the reservoir 17 through passages 67. The predetermined force level of the relief valve 68 can be adjusted by means of a spring which bears on a valve piston of the valve 68. Check valves are provided to prevent flow from chamber 22 to chamber 24 and vice versa, even through both are connected to relief valve 68.

A rotary position encoder 83 is attached to the housing 13 adjacent the shaft 15. The position encoder 83 operates by reading movement of a rack and pinion mechanism which forms a part of the encoder 83. The rack portion of the encoder is disposed parallel to and moves with the shaft 15. The rotation of the pinion is electrically detected and can be electrically remotely read so that the position of the shaft 15 is determined. In other words, the encoder 83 produces electrical signals which indicate the amount of extension or retraction of the actuator shaft 15. This allows a confirmation of the extend or retract commands given to the motor 25. It also provides a more direct reading of the location of the shaft 15.

Figure 5:
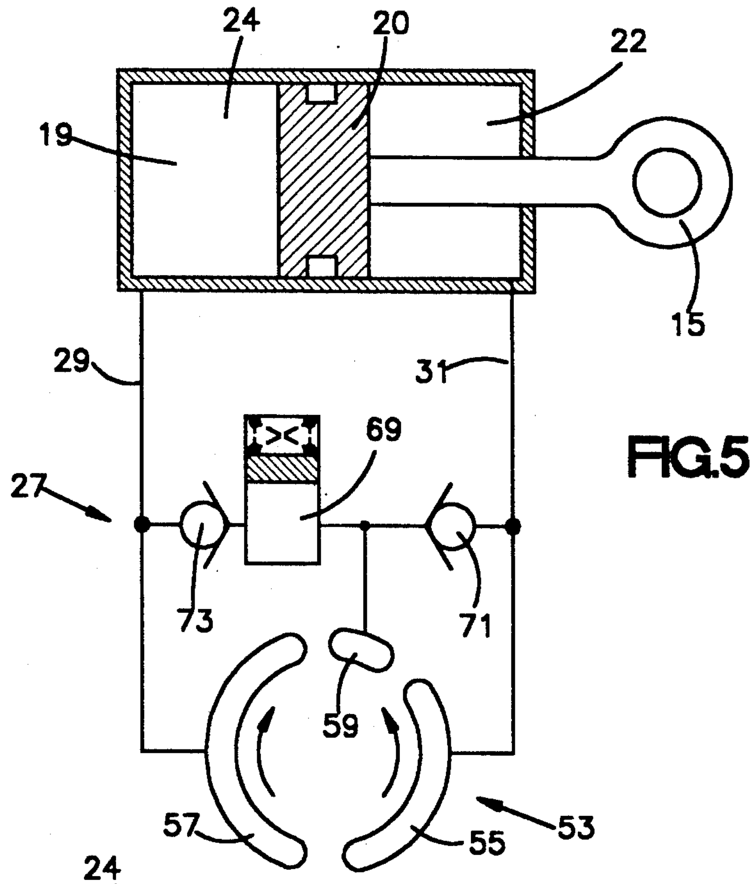
FIG. 5 is a schematic view of the same type as shown in FIG. 4 showing an alternate embodiment of a device constructed in accordance with the present invention.

Rotating piston pumps of the type shown in FIG. 3 are well known. However, the present invention provides an improvement to the porting in the pump port plate 53 to compensate for the type of actuator rod shown in FIG. 5. As shown in FIG. 5, the rod 15 does not extend through the piston head 20 so that the front chamber 22 has a different volume to rod movement ration than the rear chamber 24. In a conventional rotating piston pump, the ports 55 and 57 are symmetrical and, therefore, an equal amount of fluid is driven through each port. For an unbalanced piston as shown in FIG. 5, this requires some of the fluid to be pumped to or from a variable volume excess fluid reservoir.

The present invention provides an extra port 59 in the port plate 53 which balances the flow to or from a variable volume chamber 69. By controlling the size of port 59, a precise flow to and from the chamber 69 will balance the flows to chambers 22 and 24. This produces a much more efficient movement of fluid by providing a positive displacement of the fluid to and from the chamber 69. Check valves 71 and 73 can be provided to correct any slight differences in the flow to the chamber 69.

Figure 4:
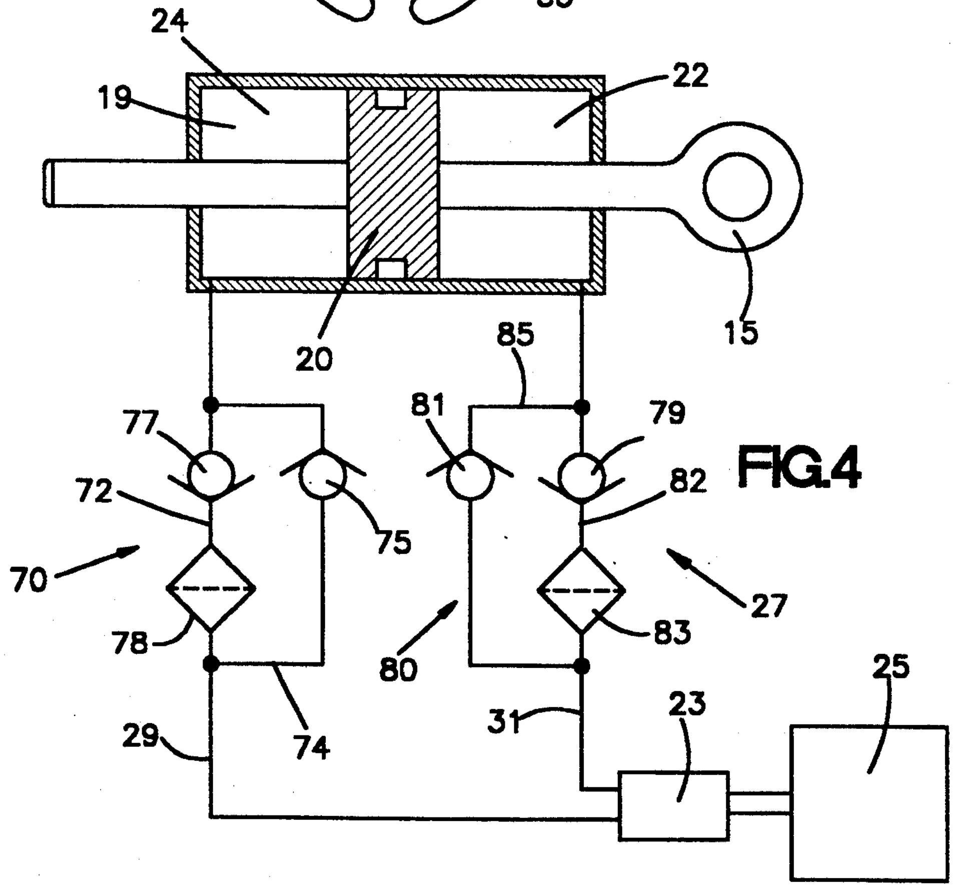
FIG. 4 is a schematic view of a portion of the device shown in FIG. 1.

Referring now to FIG. 4, the present invention also provides an improved filtration of the fluid conveyed to and from the actuator "extend" and "retract" chambers 22 and 24. The "retract" passage 31 has a one way filter and a check valve 79 which allows fluid to pas through the filter 83 only in the direction from the pump 23 toward the "retract" chamber 22. A bypass circuit with check valve 81 allows fluid to flow only in the direction opposite the flow allowed by check valve 79.

Similarly, the "extend" passage 29 has a one way filter, and a check valve 77 which allows flow from pump 23 toward chamber 24. Flow from chamber 24 toward pump 23 passes through the bypass passage 74 around the filter 78.

Thus, the electro-hydraulic actuator system of the present invention is well adapted to obtain the objectives and advantages mentioned as well as those inherent therein. While presently embodiments of the invention have been described for the purpose of this disclosure, variations and changes in the construction or arrangements of parts can be made by those skilled in the art, which changes are encompassed within the spirit of this invention as defined by the amended claims.

The foregoing disclosure and showing made in the drawings are merely illustrative of the principles of this invention and are not to be interpreted in a limiting sense.

What is claimed is:

1. An electro-hydraulic actuator, comprising:

a. a housing having a hydraulic reservoir chamber with a reservoir of hydraulic fluid therein, and having a cylinder chamber therein;

b. an actuator piston and an actuator rod connected thereto, said piston being movable in said cylinder chamber, and said actuator piston dividing said cylinder chamber into a "retract" chamber at the forward end of said cylinder chamber and an "extend" chamber at the rearward end of the cylinder chamber;

c. a hydraulic pump disposed in said hydraulic reservoir for pumping hydraulic fluid to said cylinder chamber to move said actuator rod by hydraulic pressure;

d. an electric motor mechanically connected to said hydraulic pump to drive said hydraulic pump for pumping said hydraulic fluid;

e. hydraulic passages disposed in said housing and connecting said pump to said hydraulic reservoir chamber and said cylinder chamber for moving said actuator piston in said cylinder chamber;

f. a bellows reservoir disposed in said hydraulic reservoir chamber and containing a pressurized gas so as to have a variable displacement of hydraulic fluid in said hydraulic reservoir chamber to compensate for any volumetric changes in the hydraulic fluid therein;

g. a temperature sensor disposed for measuring temperature changes of gas in said bellows reservoir; and h. a temperature sensor disposed for measuring temperature changes in hydraulic fluid in said hydraulic reservoir chamber.

2. The device of claim 1 wherein said motor comprises a brushless, DC electric motor.

* * * * *